United States Patent
Fontes, Jr.

(10) Patent No.: US 6,912,707 B1
(45) Date of Patent: Jun. 28, 2005

(54) METHOD FOR DETERMINING OBJECT EQUALITY

(75) Inventor: Alfred Joseph Fontes, Jr., San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 821 days.

(21) Appl. No.: 09/296,020

(22) Filed: Apr. 21, 1999

(51) Int. Cl.$^7$ ................................................ G06F 9/44
(52) U.S. Cl. ........................ 717/113; 717/105; 717/109; 715/762; 715/763
(58) Field of Search .............................. 382/276, 283, 382/217; 345/348, 473, 433, 302, 733; 707/500; 717/104–113; 715/762, 763

(56) References Cited

U.S. PATENT DOCUMENTS

| | | | | |
|---|---|---|---|---|
| 5,495,539 A | * | 2/1996 | Sieverding | 382/276 |
| 5,668,897 A | * | 9/1997 | Stolfo | 382/283 |
| 5,754,190 A | * | 5/1998 | Dutton et al. | 345/473 |
| 5,874,951 A | * | 2/1999 | Sakakibara et al. | 345/302 |
| 5,973,692 A | * | 10/1999 | Knowlton et al. | 345/348 |
| 5,999,182 A | * | 12/1999 | Etchemendy et al. | 345/356 |
| 6,124,864 A | * | 9/2000 | Madden et al. | 345/473 |
| 6,232,983 B1 | * | 5/2001 | Felser et al. | 345/433 |

* cited by examiner

*Primary Examiner*—Tuan Dam
*Assistant Examiner*—Chuck Kendall
(74) *Attorney, Agent, or Firm*—Gates & Cooper LLP

(57) ABSTRACT

A comparator is described that allows two graphical software objects to be compared and the differences between the objects selectively combined into a single file. The comparator uses different modes to determine how to combine the software objects, typically based on time stamp information appended to each file. Several methods of comparison for objects within the files are used to expedite comparison times and provide users with flexibility and ease of use of the comparison tool.

30 Claims, 16 Drawing Sheets

METHOD FOR DETERMINING OBJECT EQUALITY

BACKGROUND OF THE INVENTION

1. Field of the Invention

The present invention relates generally to software objects, and in particular, to a method, apparatus, and article of manufacture for determining object equality.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and do little to help the user determine the changes made between one version of a drawing and another. Further, the templates and palettes provide little assistance in merging desired changes from one drawing into another.

Consequently, there is a need in the art for improved techniques for creating components in a CAD program, in order to create documents and resolve differences between drawing revisions faster. Further, there is a need in the art for improved techniques for comparisons between software objects.

SUMMARY OF THE INVENTION

To address the requirements described above, the present invention discloses a method, apparatus, and article of manufacture for comparing a first graphical software object with a second graphical software object, determining a difference between the objects, and selectively altering the first graphical software object based on a selectable mode of comparison between the first graphical software object and the second graphical software object.

The present invention employs several modes of comparison, as well as several modes of resolving computer file differences to expedite comparison times and provide users with flexibility and ease of use of the comparison tool of the present invention.

BRIEF DESCRIPTION OF THE DRAWINGS

Referring now to the drawings in which like reference numbers represent corresponding parts throughout:

FIGS. 16A and 16B illustrate summaries of the comparison presented by the present invention;

DETAILED DESCRIPTION OF THE PREFERRED EMBODIMENTS

Figure 1:
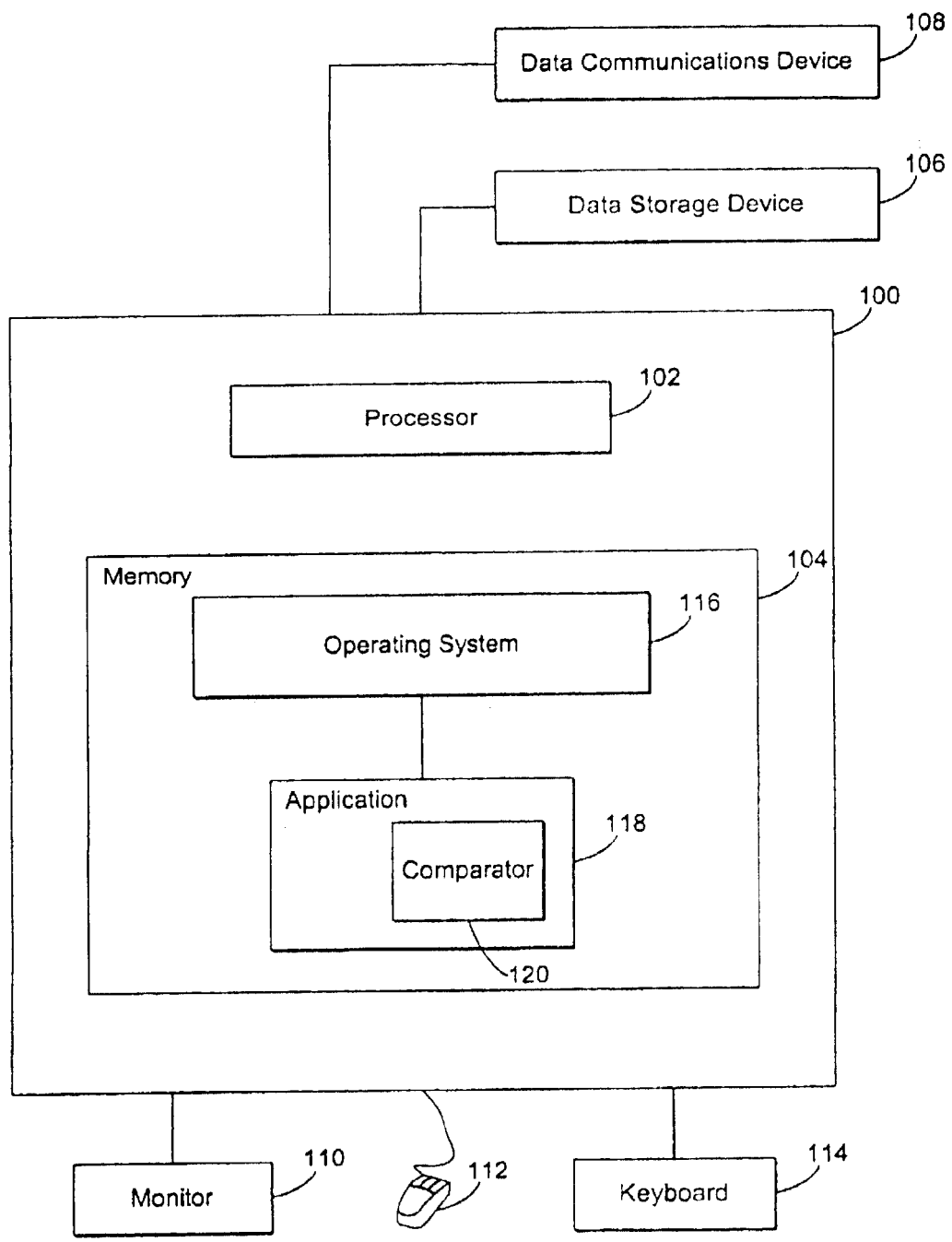
FIG. 1 is an exemplary hardware environment used to implement the preferred embodiment of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a software system that allows several people to work on multiple revisions of the same drawing and combine the multiple revisions into a single file containing all of the work done by each individual. The present invention illustrates and reconciles differences between the drawing versions in an orderly and known fashion. This technique is called Drawing Diff and Merge PDM).

Using the present invention allows for several people to add to or modify a drawing, and then merge their additions or modifications with other additions or modifications to the drawing made by others. This allows for each person to see how others are adding to or changing the drawing, and highlights any differences to the users for correction, deletion, or for revision status purposes.

Hardware Environment

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 and a comparator 120 that operate under the control of the operating system 116. The application program 118 is usually a CAD program or other graphics program.

Generally, the application program 118 comprises instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Drawing Modes

There are several scenarios that the present invention provides assistance to Computer Aided Design (CAD) draftspeople. For example, an architect and an engineer are working on a design project together, and each adds their own additions and modifications to a common drawing.

Mode 1: Revert Mode

Figure 2:
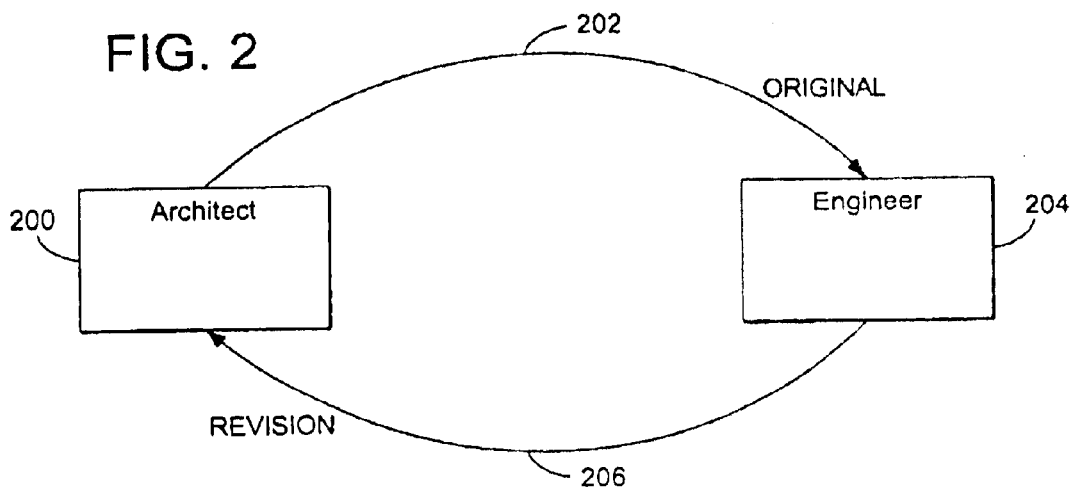
FIG. 2 illustrates the transportation of files for a revert scenario of the present invention.

FIG. 2 illustrates the transportation of files for a revert scenario of the present invention. In the revert mode, the architect 200 creates several CAD drawing files, e.g., elevation, perspective, and floor layout drawings of a house, and gives these CAD drawing files via transport 202 to engineer 204. Engineer 204 needs to add additional objects to the CAD drawing files, e.g., walls, dimensions of lumber, doors, structural notes, etc. for drawing approval and so that the house can eventually be built. During the time that engineer 204 is working on the drawings, engineer 204 inadvertently alters some other portion of the CAD drawing files, e.g., engineer 204 moves the property line within the CAD drawing file.

When engineer 204 completes his work with the CAD drawing files, engineer 204 returns the CAD drawing files to architect 200 via transport 206. The transport 202 and 206 of files can occur in a number of ways, e.g., physical transportation of the CAD file via floppy disk, tape, or other storage media, or via electronic file transfer via a network or the Internet. When architect 200 receives the revised file from engineer 202, architect 200 needs to see what, if anything, engineer 204 has modified from the original file.

Furthermore, architect 200 needs to quickly revoke any unwanted changes. For example, when architect 200 discovers that engineer 204 has moved the property line, architect 200 needs to recover the correct property line from the original drawing.

The present invention compares the original file (sent from architect 200 to engineer 204) and the revised file (sent from engineer 204 back to architect 200) and allows architect 200 to revert selected data back to its original state. This scenario, called the "revert" mode or "revert" scenario, assumes that most of the data coming from engineer 204 is correct, and the present invention only requires user interaction when something has gone wrong. The revised file (also called the revision) will be "newer" than the original file (also called the base or original), and will have a later time stamp on the file to designate the revised file as such.

Figure 3:
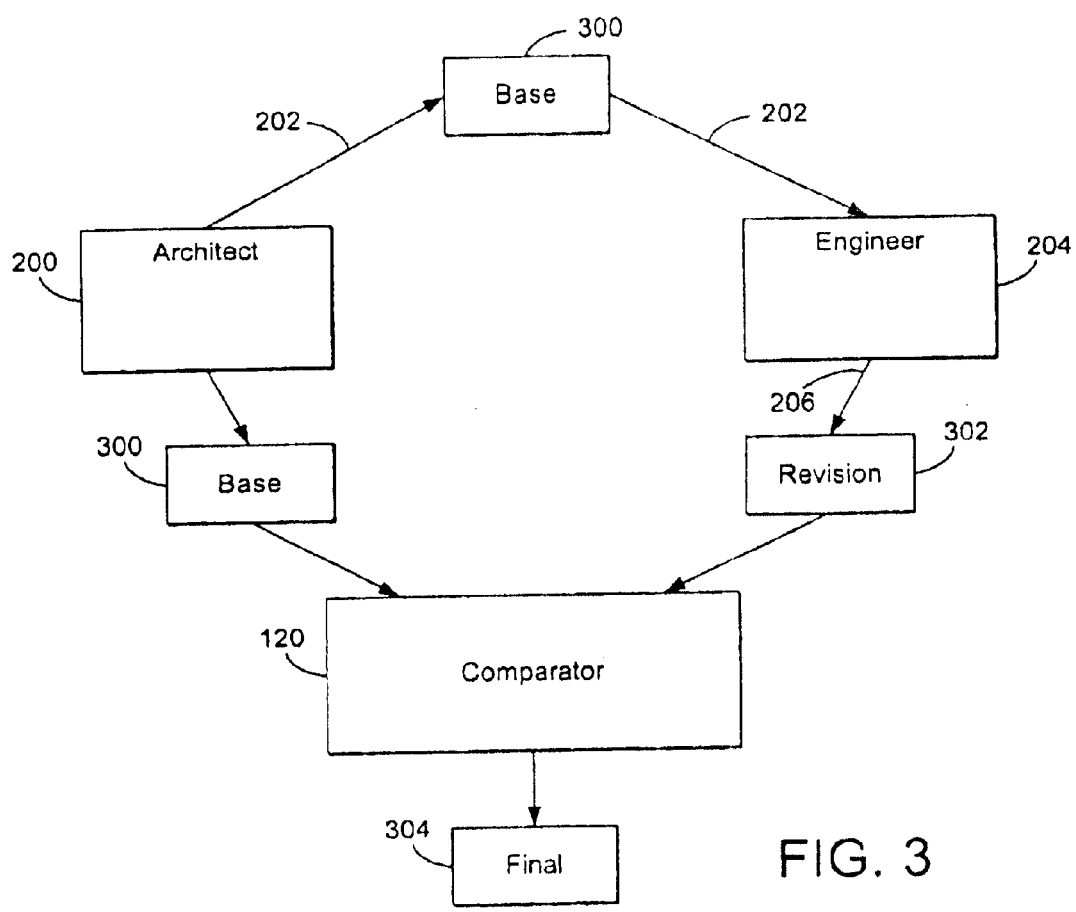
FIG. 3 illustrates the comparator of the present invention used in the revert mode.

FIG. 3 illustrates the comparator of the present invention used in the revert mode.

As described in FIG. 2, the data in the base drawing 300 flows from architect 200 to engineer 204 via path 202. Once engineer 204 adds items to the base drawing 300, engineer 204 creates revision 302. Revision 302 and base 300 are inputs to comparator 120, which creates final version 304. Revision 302 and base 300 can be input to comparator 120 by either architect 200 or engineer 204.

The revert mode allows comparator 120 to make assumptions about the data in revision 302. The architect 200 only has to review the changes made to determine whether to include those changes in final version 304. When architect 200 notices that engineer 204 changed the property line in revision 302, architect can "revert" the property line back to the property line in base 300, while still keeping the other changes that engineer 204 made to revision 302.

Mode 2: Merge

Figure 4:
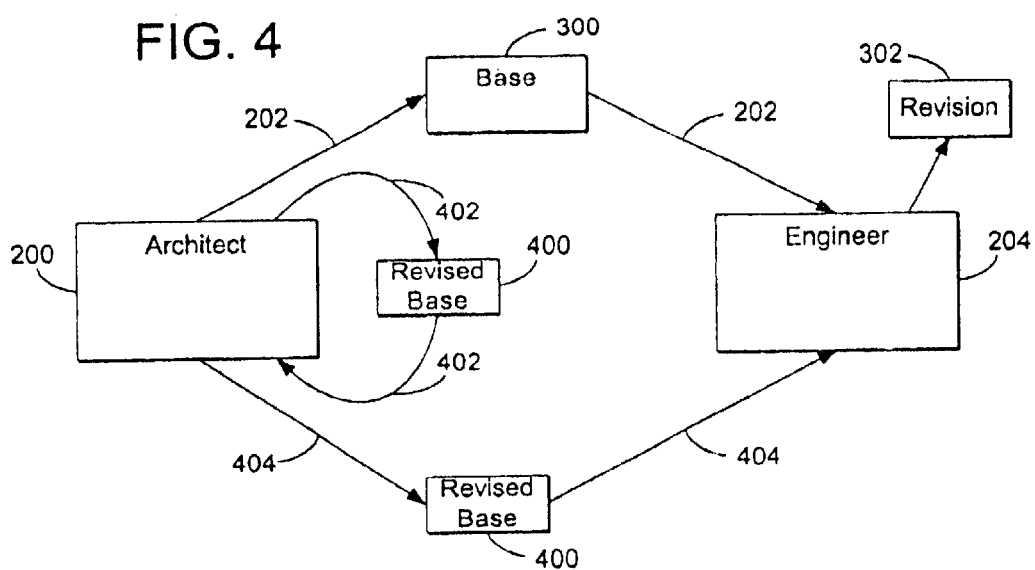
FIG. 4 illustrates transportation of files for a merge scenario of the present invention.

FIG. 4 illustrates transportation of files for a merge scenario of the present invention. In the merge mode, architect 200 creates a base CAD drawing 300 and gives the drawing to engineer 204 via path 202. While engineer 204 is adding doors, walls, etc. to the drawing and creating revision 302, architect 200 continues working in parallel on the base drawing as shown in path 402. The "revised" base drawing 400 is then sent to engineer 204 via path 404.

Engineer 204 now must "merge" the changes made to base 300 (in revision 302) with revised base 400, without deleting the additions that engineer 204 has made to base 300 in creating revision 302 or deleting the changes architect 200 made to revised base 400. The comparator 120 must make different assumptions about the data in revision 302 in the merge case than in the revert case.

Figure 5:
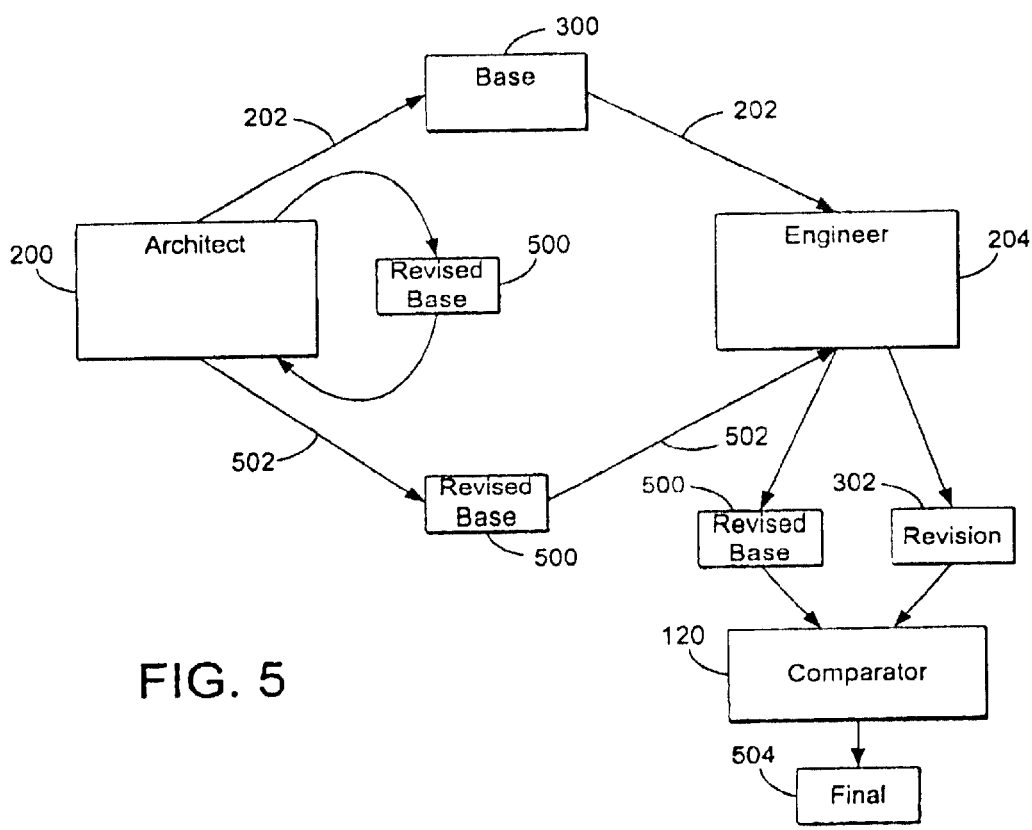
FIG. 5 illustrates the data flow for the comparator in the merge mode.

FIG. 5 illustrates the data flow for the comparator in the merge mode. As described in FIG. 4, the data in the base drawing 300 flows from architect 200 to engineer 204 via path 202. Once engineer 204 adds items to the base drawing 300, engineer 204 creates revision 302. Architect 200 then creates revised base drawing 500 and sends revised base drawing 500 to engineer 204 via path 502. Engineer 204 then inputs revised base drawing 500 and revision 302 into comparator 120, which creates final version 304.

The merge mode allows comparator 120 to make different assumptions about the data in revision 302 and revised base drawing 500 than in the revert mode. In merge mode, the assumption is that all data changes in revision 302 are correct.

Mode 3: Parallel Evolution

Figure 6:
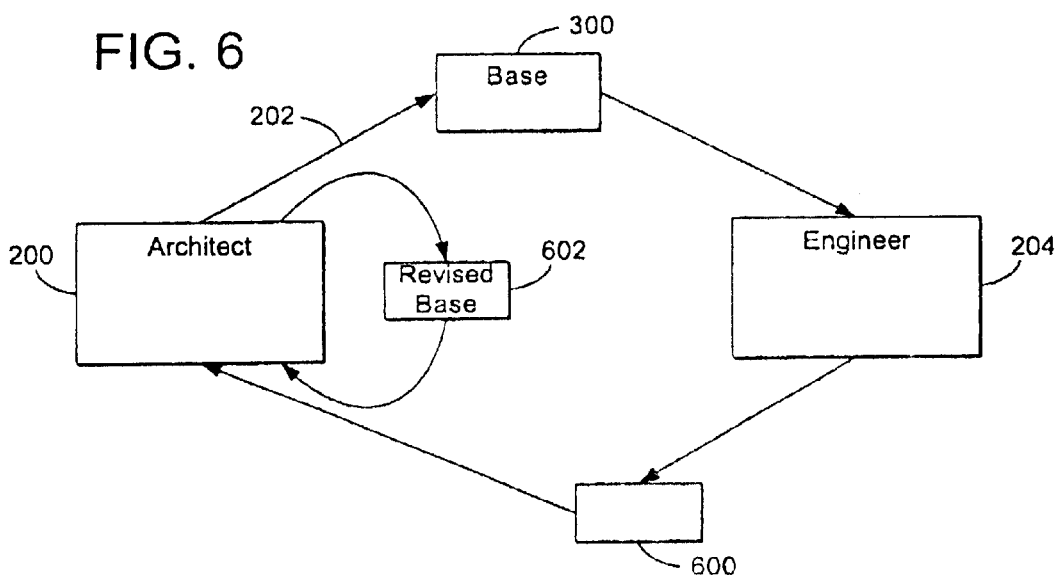
FIG. 6 illustrates transportation of files for the parallel evolution mode of the present invention.

FIG. 6 illustrates transportation of files for the parallel evolution mode of the present invention. Architect 200 creates base drawing 300 and sends base drawing 300 to engineer 204 via path 202. While engineer 204 is creating revision 600, architect is creating revised base drawing 602. Engineer sends revision 600 back to architect 200, who must then combine the changes made in revised base drawing 602 with the changes made in revision 600. This mode is called a parallel evolution mode because the data from each drawing is considered equally valid; no assumptions are made with respect to the drawings based on time stamps or other identifers.

Figure 7:
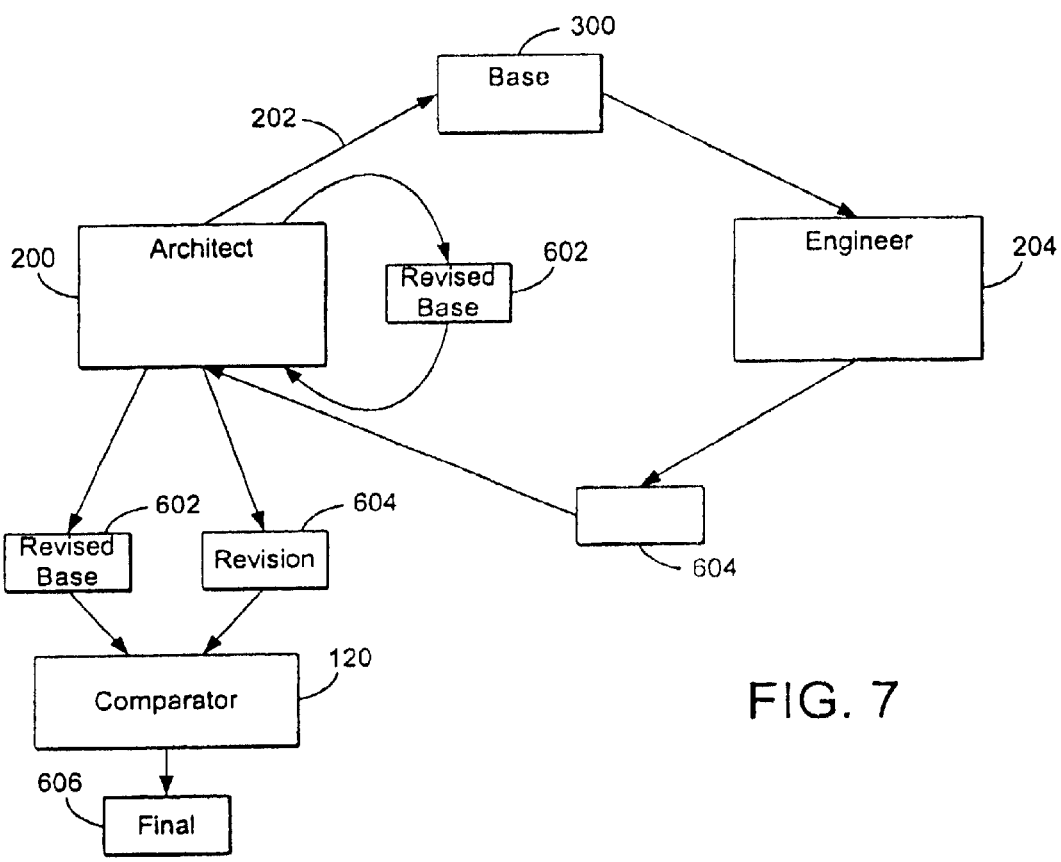
FIG. 7 illustrates the data flow for the comparator in the parallel evolution mode.

FIG. 7 illustrates the data flow for the comparator in the parallel evolution mode. As discussed with respect to FIG. 6, once architect 200 receives revision from engineer 200 and has finished making the changes to revised base drawing 602, architect 200 inputs revised base drawing 602 and revision 604 into comparator 120. Comparator 120 then compares the two versions of the drawings and produces final drawing 606.

Other modes, or combinations of the above modes, are also possible with the present invention.

Comparing DWG Files

When comparing drawing PWG) files, knowing that two entities are different is typically not enough information to allow the user to choose which of the entities is correct. The user must know how the two entities are different. For example, if two complicated solids are different, a user might have trouble detecting the exact location of the difference. Manually comparing the objects could be a slow, painful process. The present invention determines when two entities are different and illustrates the difference to the user.

There are several strategies for determining how to reconcile the differences between two entities. One entity can be replaced by the other in its entirety, the geometry from one entity can be merged while leaving the remainder of the entity alone, etc. The choice of difference reconciliation will depend on the mode of operation and user preference.

Comparsion Techniques

Figure 8A:
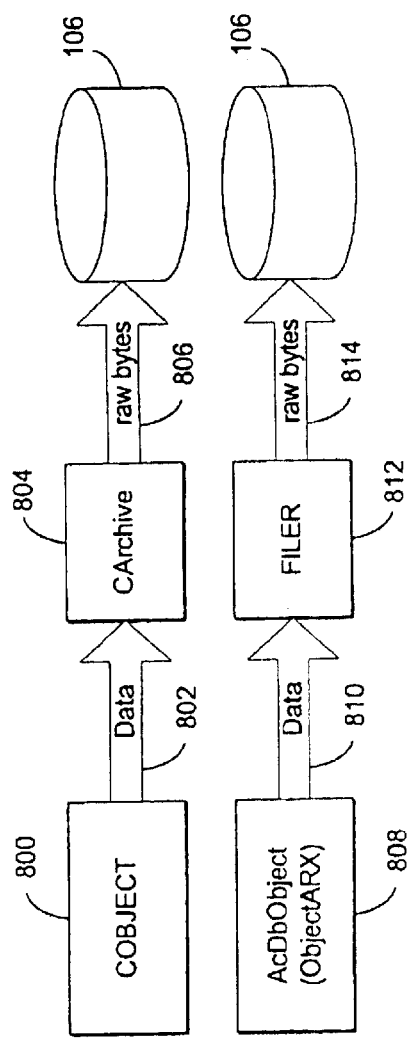
FIGS. 8A–8B illustrate the persistence and comparison functions of the present invention.
Figure 8B:
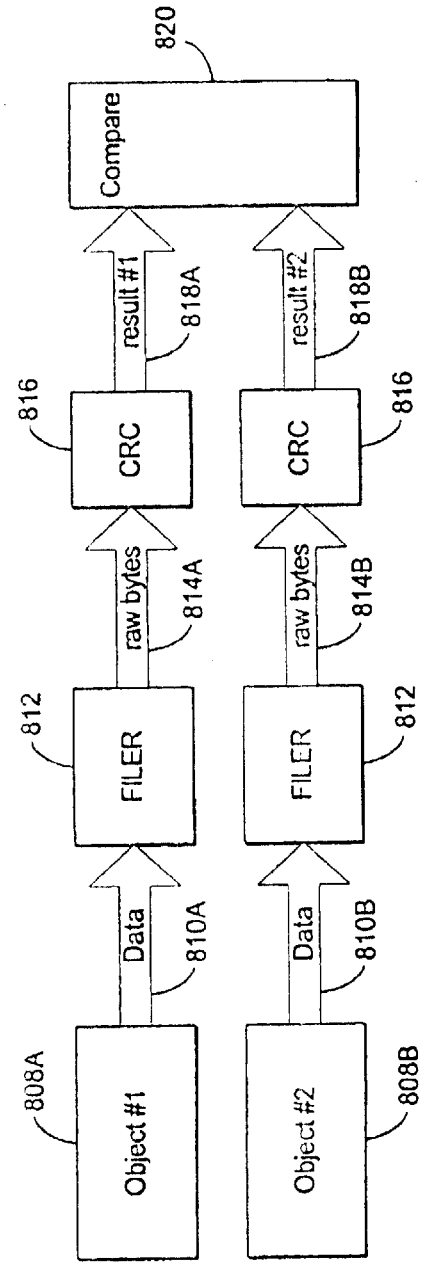

FIGS. 8A–8B illustrate the persistence and comparison functions of the present invention.

FIG. 8A illustrates typical persistence mechanisms used in Microsoft Foundation Classes (MFC) and object-oriented systems. In MFC, CObject 800 data 802 is routed through CArchive program 804 to convert data 802 to raw bytes 806. Raw bytes 806 are then stored on data storage device 106. In a different embodiment of an object-oriented system, the object 808 data 810 is routed through a filer 812 to convert data 810 to raw bytes 814. Raw bytes 814 are then stored on data storage device 106.

FIG. 8B illustrates the comparison used in the present invention. Two objects 808, namely object 808A and 808B are chosed for comparison to determine object equality. Object 808A data 810A is routed through filer 812 to convert data 810A into raw bytes 814A corresponding to object 808A. Similarly, object 808B data 810B is routed through filer 812 to convert data 810B into raw bytes 814B corresponding to object 808B. A "Cyclic Redundancy Check" (CRC) 816 is performed on raw bytes 814A, which produces result 818A. A CRC 816 is also performed on raw bytes 814B, which produces result 818B. Results 818A and 818B are compared in comparator 820. If results 818A and 818B are the same, then object 808A and 808B are considered to be the same. A similar comparison scheme is used for MFC objects 800, with filer 812 being replaced by CArchive 802.

Displaying Differences

When displaying differences between one drawing and another, the differences are displayed in windows. All differences are available from the same window. User interaction with keyboard 114 or mouse 112 typically controls which elements of the two drawings are displayed.

Figure 9:
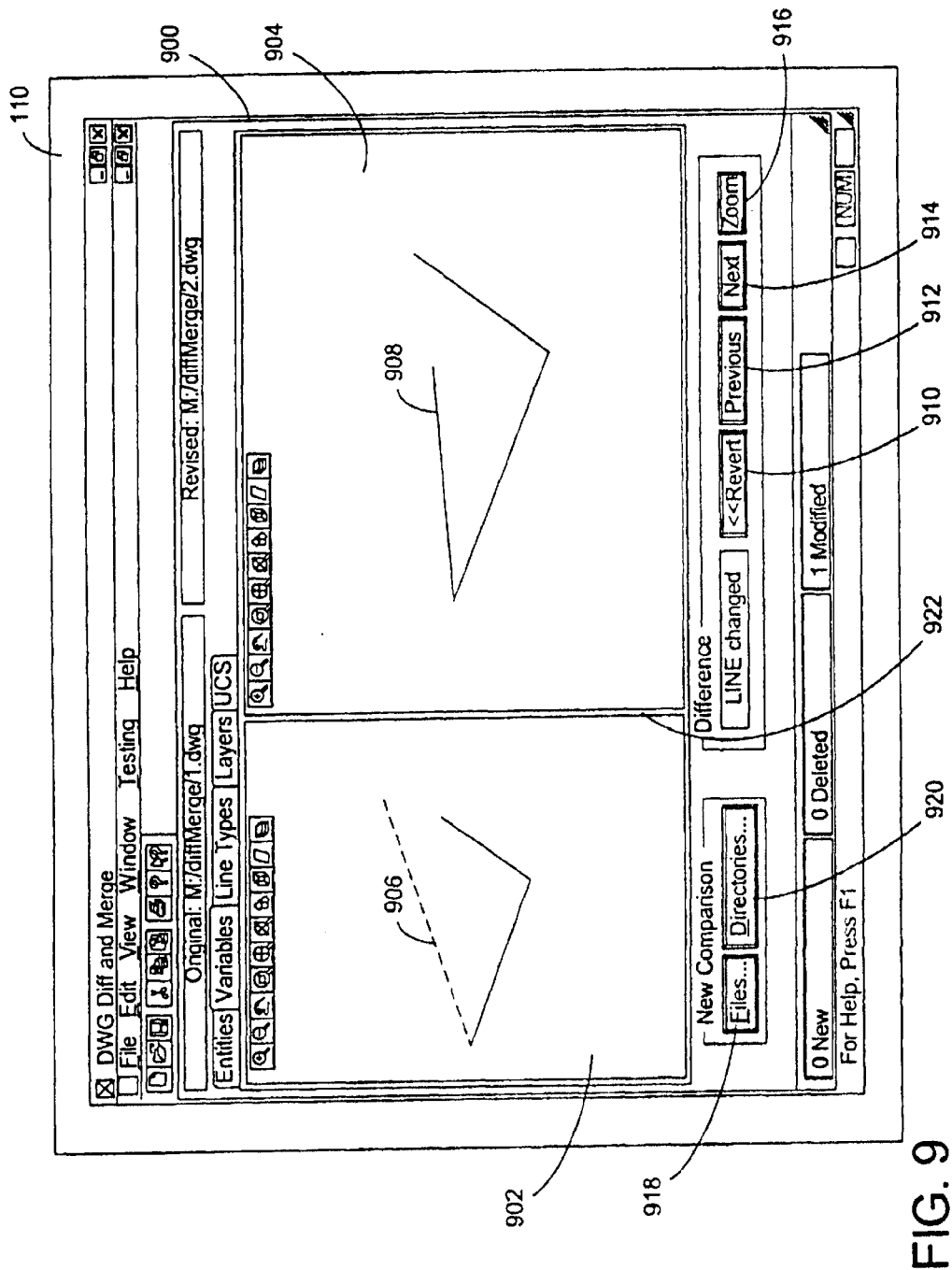
FIG. 9 illustrates the display on the monitor in the revert mode of the present invention.

FIG. 9 illustrates the display on the monitor 110 in the revert mode of the present invention. Window 900 is typically divided into two windows, 902 and 904. Window 902 displays base drawing 300, and window 904 displays revision 302. In window 902, line 906 is shown as a dashed line, and in window 904, line 908 is shown as a solid line. This indicates to the user that line 906 and line 908 are different between the two drawings. Other indications of differences between base drawing 300 and revision 302 are possible with the present invention, e.g., lines can be displayed in different colors, can "blink" on and off to show differences, or any other manner of indicating to the user that something has changed between the two drawings.

The user cannot change the base drawing 300 illustrated in window 902 in the revert mode, because in revert mode, the base drawing 300 is assumed to be correct. This assumption is made because the base drawing 300 has a time stamp that is earlier in time than the revision 302. Once the difference between the two drawings is made apparent to the user, the user can then select from buttons 910–916 as to what to do about the differences between the drawings.

If the user wants the final version 304 to look like the base drawing 300, the user would click the mouse 112 on button 910, which would revert revision 302 to base drawing 300 for this difference only. If the user wants the final drawing to look like the revision 302, the user can select the next button 914 to go to the next change. If the user goes past a change and wants to review it again, the user can review previous changes by selecting button 912, and if the user wants to see more details about the change, the user can zoom in on the change by selecting button 916. Keyboard 114 commands are available that correspond to the selection of buttons 910–916.

If the user wished to view different files, or compare different directories, buttons 918 and 920 allow the user to view different files or directories for comparison.

The vertical line 922 between the two drawing windows 902 and 904 is a splitter bar. Line 922 can be dragged right or left with the mouse 112 to change the relative sizes of the two windows 902 and 904. The compare windows 902 and 904 can also be oriented horizontally, with line 922 stretching from the left edge to the right edge of the window 900.

Merge Mode

Figure 10:
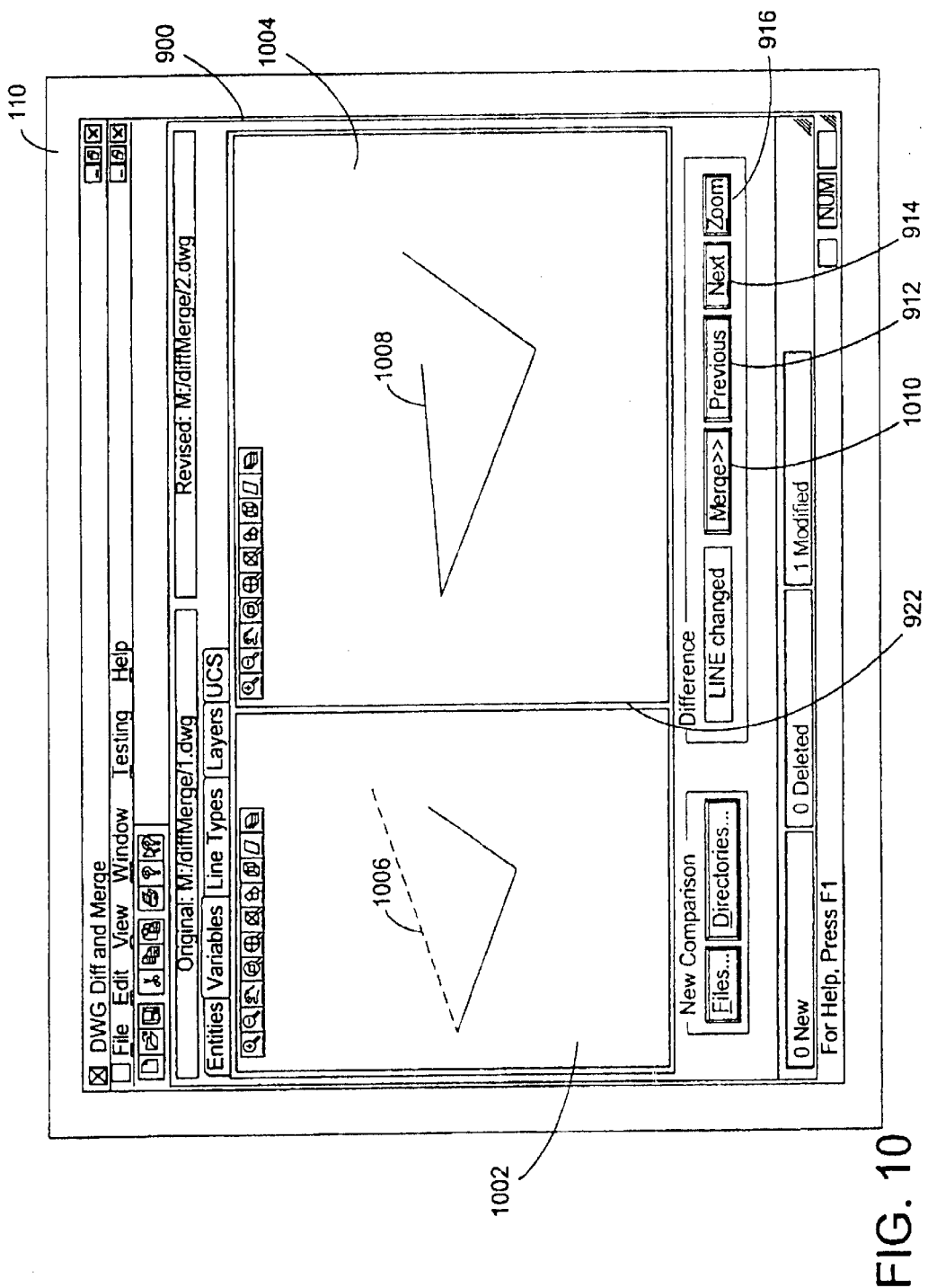
FIG. 10 illustrates the display on the monitor in the merge mode of the present invention.

FIG. 10 illustrates the display on the monitor 110 in the merge mode of the present invention. Window 900 is again typically divided into two windows, 1002 and 1004. Window 1002 displays revision 302, and window 1004 displays revised base 500. In window 1002, line 1006 is shown as a dashed line, and in window 904, line 1008 is shown as a solid line. This indicates to the user that line 1006 and line 1008 are different between the two drawings.

In the merge mode, the revision 302 has a time stamp that is earlier in time than revised base 500. Thus, the comparator considers revision 302 to be correct, and displays changes to revision 302 instead of revised base 500.

In merge mode, button 1010 allows the user to merge the changes of revised base 500 shown in window 1004 into revision 302 shown in window 1002. Buttons 912–916, and the function of line 922, are identical to those described with respect to FIG. 9.

Parallel Mode

The user interface for parallel evolution mode is similar to that of merge mode as shown in FIG. 10. The only difference is that the user can define which file is considered the revision 302 and which file is considered the revised base 500, such that the user-defined revision file 302 appears on the left and the user-defined revised base 500 file appears on the right. The revision 302 is then merged into the revised base 500.

Other Drawing Differences

Figure 11:
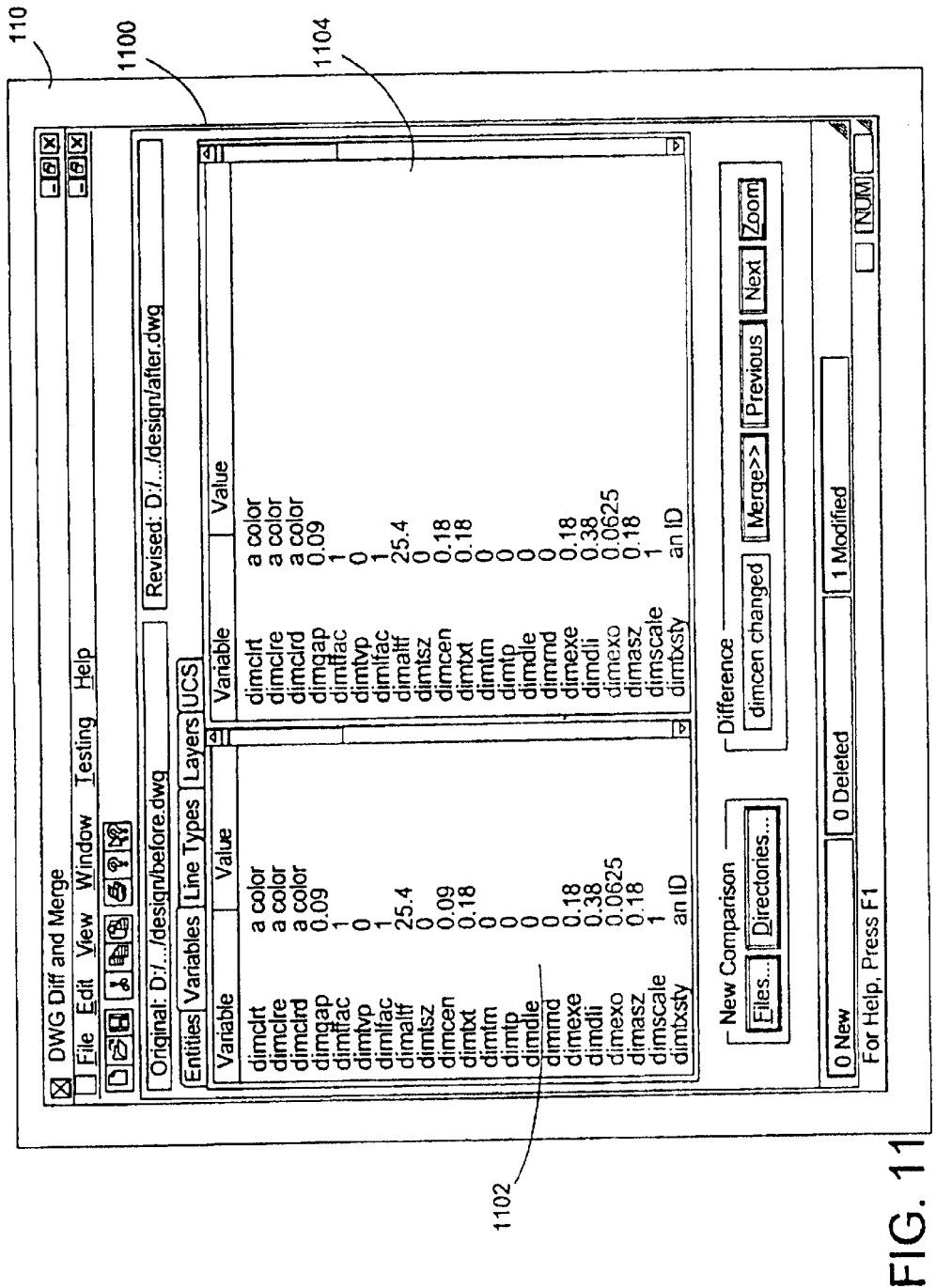
FIGS. 11–14 illustrate displaying other drawing differences using the present invention.

FIGS. 11–14 illustrate displaying other drawing differences using the present invention. Typically, other differences in the drawings, such as system variations (Sysvar), dimension variations (Dimvar), layer differences, viewport differences, UCS differences, text styles, dimension styles, line styles, and other differences are typically compared in a textual context. FIG. 11 illustrates window 1100, containing windows 1102 and 1104, showing a side-by side comparison of system variations between base drawing 300 and revision 302. The window 1100 can also be used with the merge and parallel evolution mode of the present invention.

Viewport differences and dimension style comparisons are treated as special cases of entity comparison. The window 1100 for the comparison are typically sketches of base drawing 300 and revision 302 paper spaces.

Figure 12:
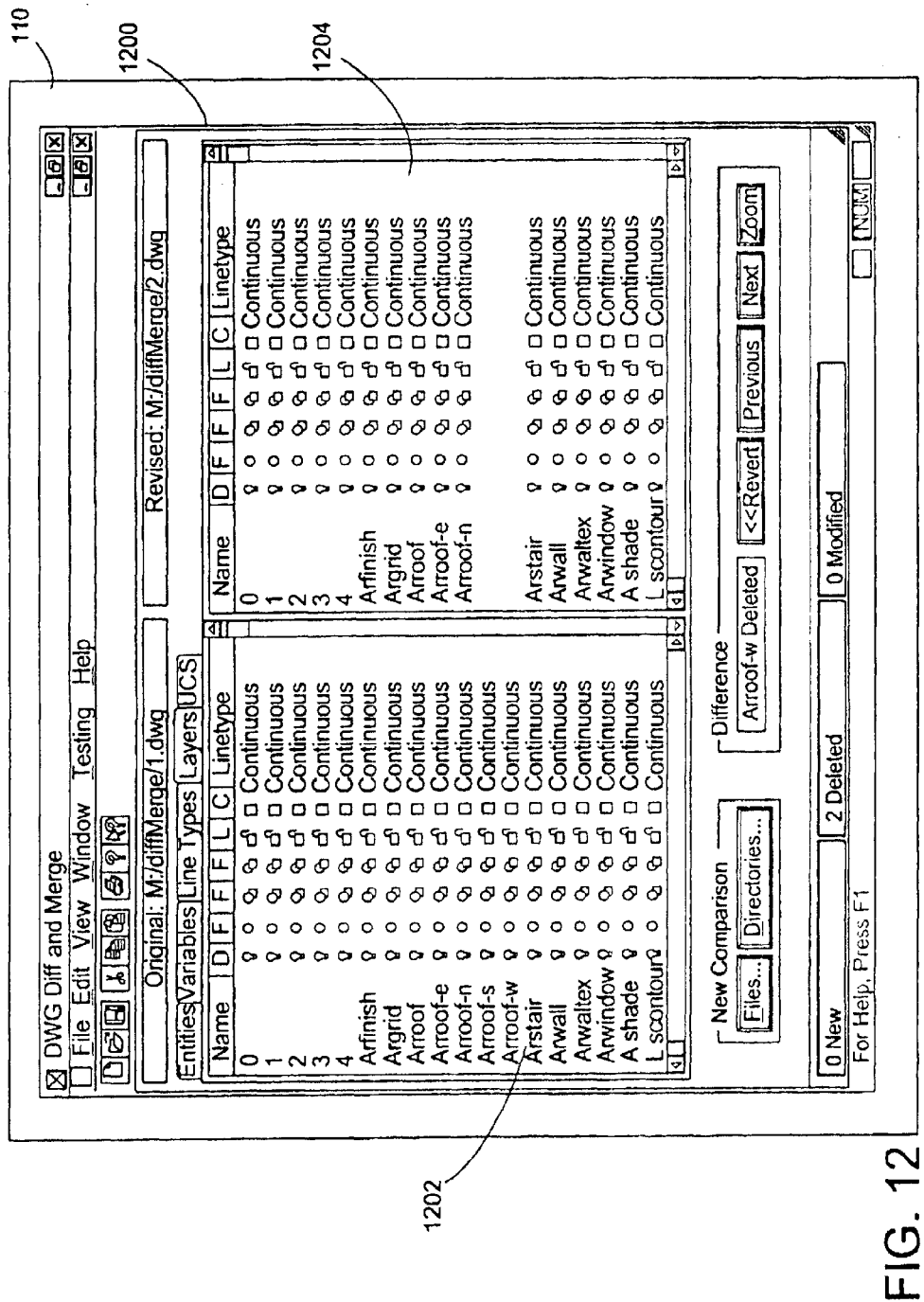

FIG. 12 illustrates displaying differences in layers between base drawing 300 and revision 302. Window 1200 contains windows 1202 and 1204, which display the layer information for base drawing 300 and revision 302. Window 1200 can also be used with the merge and parallel evolution mode of the present invention. If a layer is missing from either base drawing 300 or revision 302, the layer appears as a blank line in the other drawing file's window 1202 or 1204.

Figure 13:
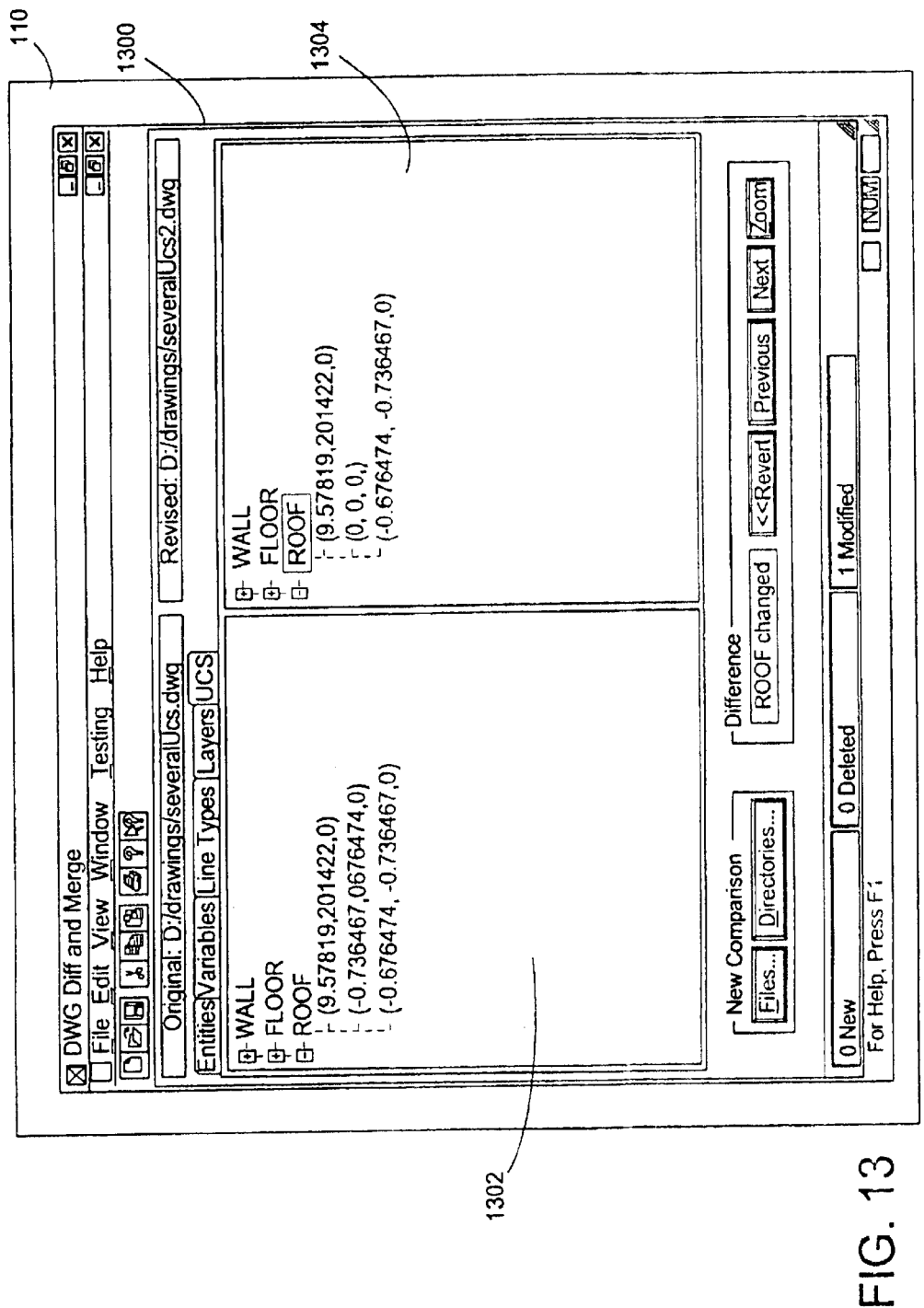

FIG. 13 illustrates displaying differences in User Coordinate Systems (UCS) between base drawing 300 and revision 302. Window 1300 contains windows 1302 and 1304, which display the UCS information for base drawing 300 and revision 302. Window 1300 can also be used with the merge and parallel evolution mode of the present invention. Each node at the root level of the tree represents a UCS. UCS are defined by 12 double-precision numbers that are normally hidden. The user views these numbers by clicking on a tree-view node, as has been done with "ROOF" in window 1304. A similar window 1300 can be used to view differences in named views of base drawing 300 and revision 302.

Figure 14:
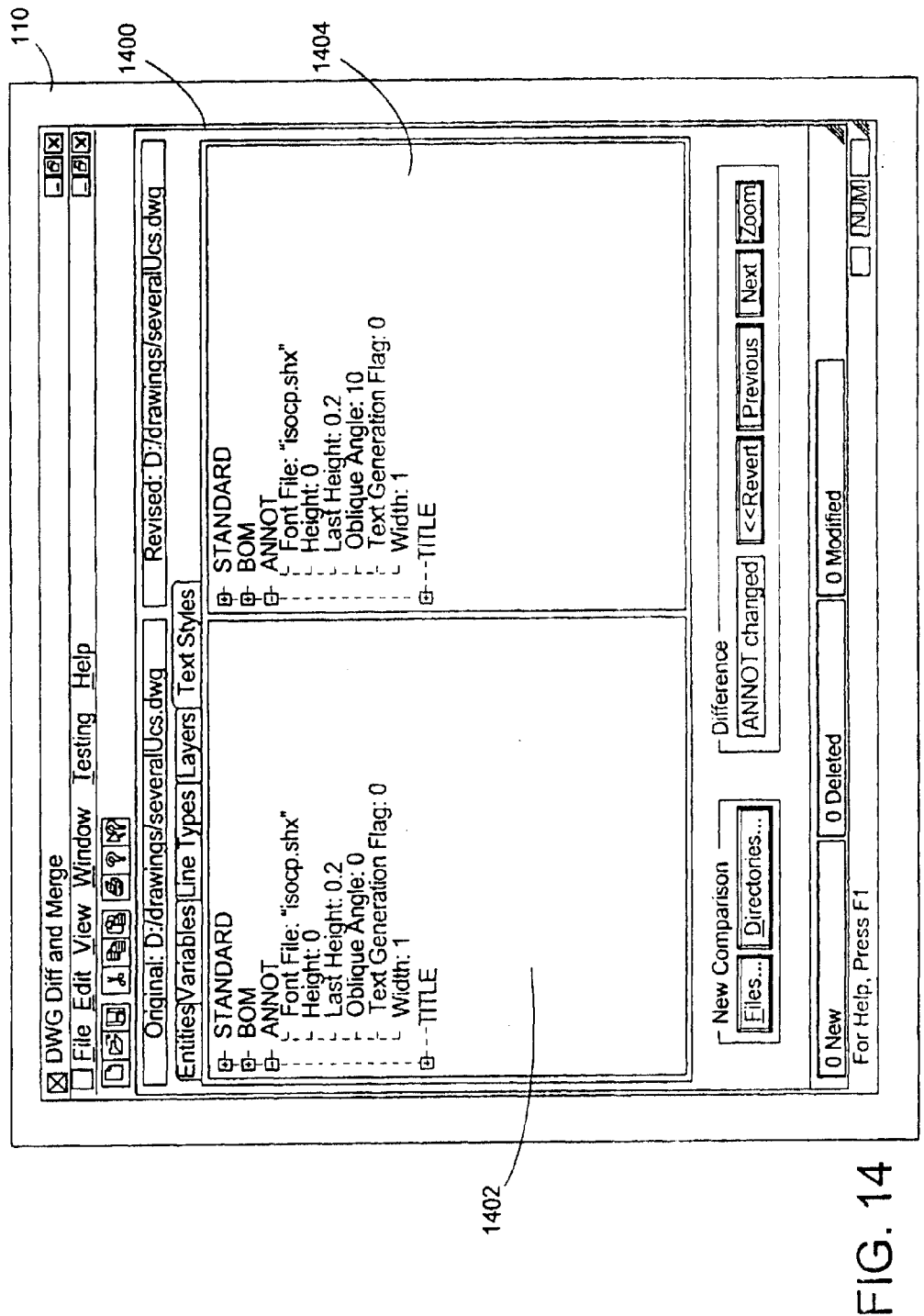

FIG. 14 illustrates displaying differences in text styles between base drawing 300 and revision 302. Window 1400 contains windows 1402 and 1404, which display the text style information for base drawing 300 and revision 302. Window 1400 can also be used with the merge and parallel evolution mode of the present invention. Text styles can be represented textually or graphically. A similar window 1400 is used to illustrate the difference in line types between base drawing 300 and revision 302.

Directory Comparison

Figure 15:
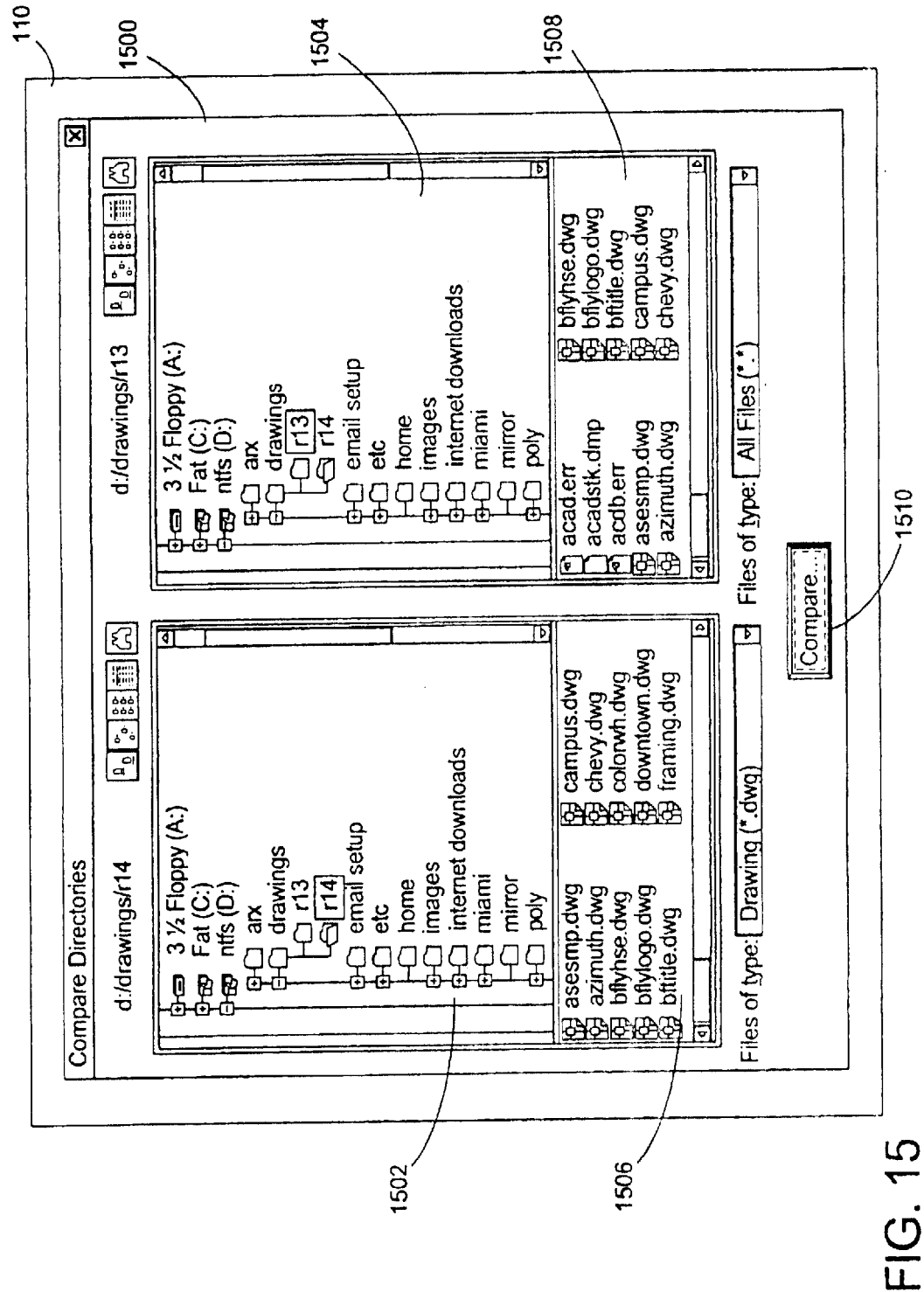
FIG. 15 illustrates comparison of two directories using the present invention.

FIG. 15 illustrates comparison of two directories using the present invention. When a collection of drawings needs to be compared, e.g., when a set of drawings has been updated and a user wishes to compare old versions to new ones to see what has changed, the present invention allows a user to compare entire directories or selected subsets of two directories. The present invention performs a directory comparison as shown in FIG. 15.

FIG. 15 illustrates window 1500, containing window 1502 and 1504. The user then selects a directory from the file tree shown in windows 1502 and 1504. The comparator 120 then compares the files within each directory by name. For example, a file named "xyz.dwg" in window 1502 will be compared to the file named "xyz.deg" in window 1504. If files appear in only one directory, the present invention will do no comparison, but can report that additional files appear in one directory and not the other similar to the way the present invention reports missing layers, etc. as described in FIG. 14.

The user can also select specific files for comparison in windows 1506 and 1508. If no files are selected within windows 1506 and 1508, the comparator 120 will compare all files within the chosen directories in windows 1502 and 1504 should be compared. If files are selected in windows 1506 and 1508, then only the selected files are compared by the comparator 120.

After the files or directories have been chosen, a click on compare button 1510 starts comparator 120 performing a batch comparison.

Figures 16A, 16B:
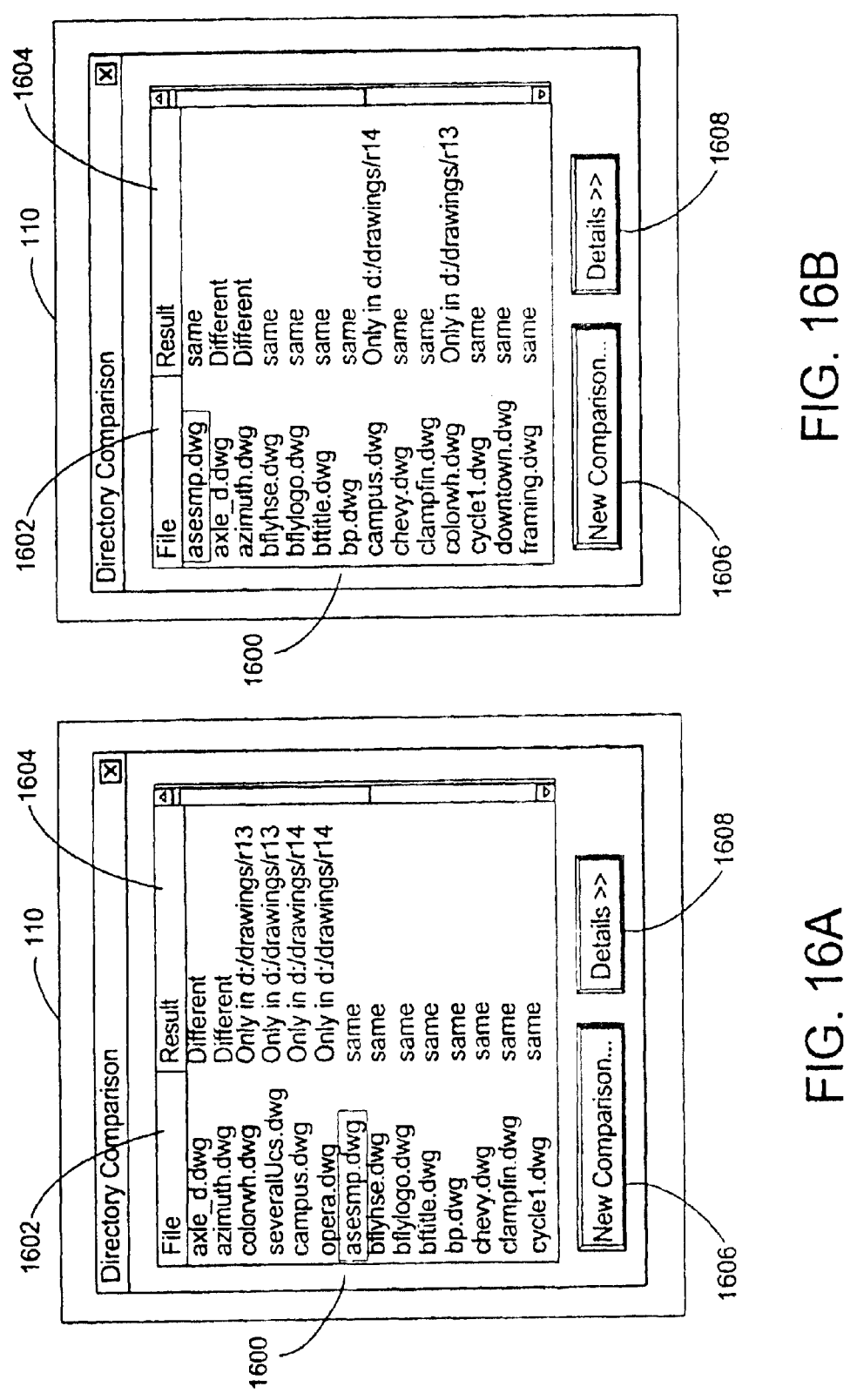

FIGS. 16A and 16B illustrate summaries of the comparison presented by the present invention. FIG. 16A illustrates the comparator 120 of the present invention outputting on window 1600 a list of all files compared in the comparison described in FIG. 15. The summary is shown in result order in FIG. 16A, and file alphabetical order in FIG. 16B. By clicking on the column headers 1602 and 1604, the user can change the sort order of the list. The comparison can take place in a separate thread or process of computer 100, allowing display of partial results as they become available.

If the user clicks on New Comparison button 1606, window 1500 of FIG. 15 reappears to obtain a new set of file names. If the user clicks on Details >>button 1608, comparator 120 displays differences between the selected files in window 1600, typically in a format resembling the windows shown in FIGS. 9–14.

Options for Comparisons

Depending on the types of drawing files and the users involved with the files, different types of comparisons may be desired. The present invention allows users to compare different types of entities within each drawing file.

Figure 17:
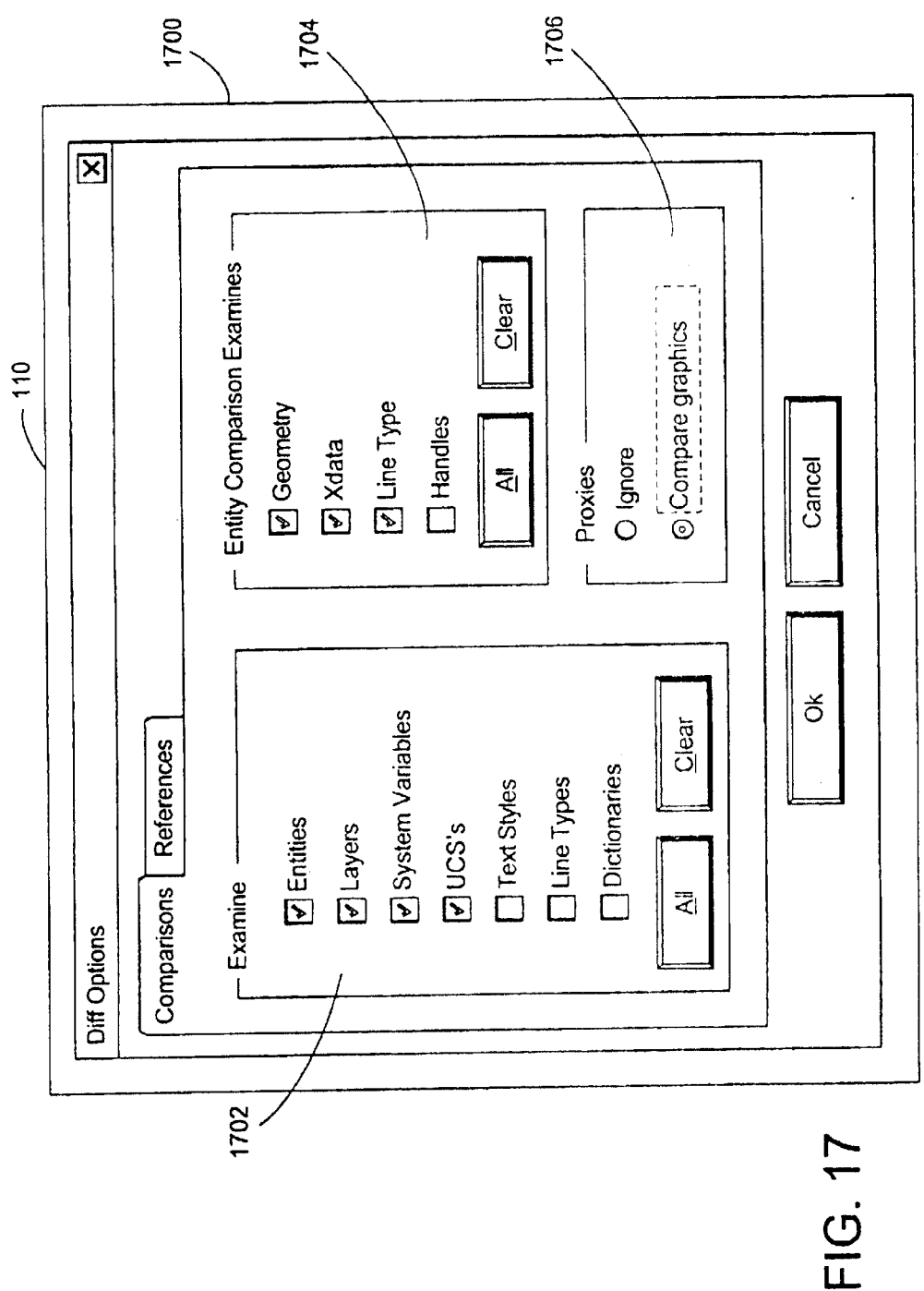
FIGS. 17 and 18 illustrate customization features for the comparator of the present invention.
Figure 18:
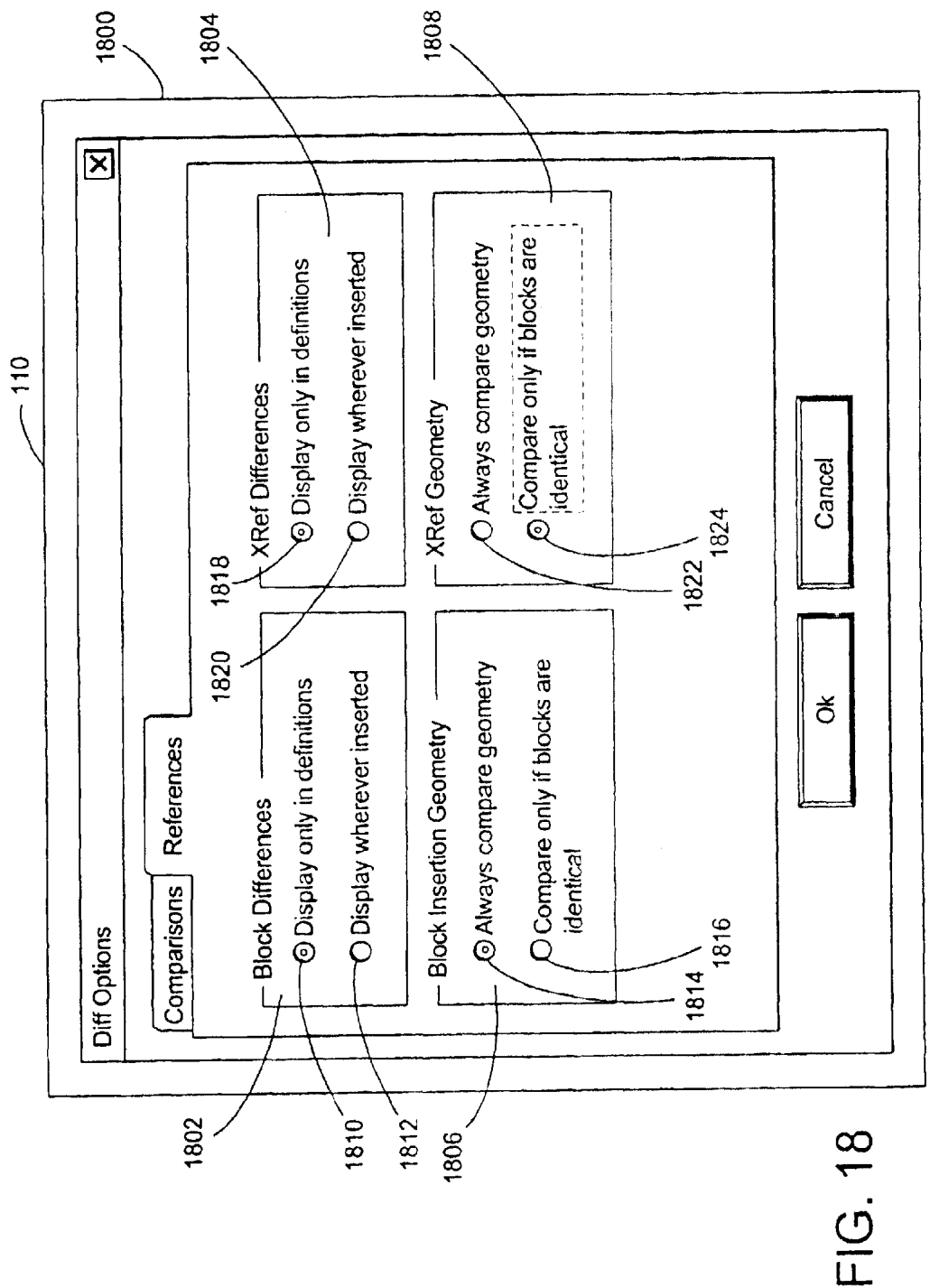

FIGS. 17 and 18 illustrate customization features for the comparator of the present invention.

FIG. 17 illustrates the different comparisons that may be included or excluded by a user using the present invention. Window 1700 contains selection boxes 1702, 1704, and 1706, each of which control different customization comparisons that a user may select or deselect with a mouse 112 or other input device to customize the comparison made by comparator 120. Within selection box 1702, the user may select to compare entities, layers, system variables, UCS's, text styles, line types, and dictionaries, and other items that the user wants to compare. Within selection box 1704, the user can select whether geometry, Xdata, line type or handles, or any combination of these items, that the comparator 120 will compare for an entity. Selection box 1706 provides proxies that the user may wish to turn on or off depending on the needs of the user.

FIG. 18 illustrates how treatment of blocks and Xref differences by the comparator 120 can be customized by the user. Window 1800 illustrates the alternate tab for window 1700. Selection boxes 1802–1808 contain selections for the user to customize comparator 120 to compare block differences, block insertion geometry, Xref differences and Xref geometry conforming to the desires of the user. The customization of the present invention illustrated in FIGS. 17 and 18 can also be used to expedite comparisons for users between drawings or directories.

When a block definition conflicts in the two drawings, it can be treated as a single difference or as many differences. The radio buttons 1810 and 1812 in the selection box 1802 determine what the comparator 120 does when it encounters differing block definitions. If radio button 1810 is chosen, block references are considered identical if they use the same block name and have the same insertion geometry. The graphical output may be different throughout the drawings, but selection of radio button 1810 will detect only one difference, namely, that of the block definitions.

If radio button 1812 is chosen, block references are considered different even if they are identical in their insertion geometry. In this case, inconsistent data resides only in the block definitions. However, because the difference is manifested everywhere the block is inserted, comparator 120 tags every reference containing that block's name.

For some users, the insertion geometry is irrelevant for inconsistent block definitions. Other users want to compare the geometry even when the blocks themselves have different definitions. Selection box 1806 allows users to customize the comparator 120 in inconsistent block definition situations. When radio button 1814 is selected, block references are considered identical as long as the name of the block and the geometry are equal. If radio button 1816 is selected, the comparator 120 examines the geometry only when the referenced block has the same definition in both files. Radio buttons 1818–1824 are analogous to radio buttons 1810–1816, but are associated with Xref-related items.

Diff Files

The present invention also allows for storing only the changes to a file, and sending only the changes between file users. For example, drawing files may appraoch 50 to 100 megabytes (MB) in size, but the changes to a file may only constitute one or two kilobytes (KB) of the entire file. The initial file transfer from one user to another cannot be avoided, but additional entire file transfers can be avoided by sending only the changes to the file on subsequent file transfers. These "changes only" files are called "Diff Files."

For example, referring to FIG. 3, instead of sending the entire revision 302 file back to architect 200, engineer 204 can send only the changes that engineer 204 made to base drawing 300. The comparator 120 then uses the diff file as the revision file 302 for comparison purposes.

A diff file must contain enough information to add, modify, and delete data in a This data is stored as a series of operations. When the user applies a diff file as a revision 302, comparator 120 iterates through the database operations and applies each one to the base drawing 300.

Viewing the diff file as a collection of records, a typical record for entity data would have an operation that is performed on the entity, e.g., update, delete, or insert; data needed if the operation is an update or insertion, and the handle of the entity, if it is an update or deletion.

The data is stored in a filer system, also called an AcDbFiler. Comparator 120 informs the new or modified entity to persist itself to the special filer. The resulting binary data is stored in the diff file. When the diff is applied, the new or modified entity will read itself in, again from a special filer.

For symbol table data, a record in the diff file contains the symbol table name, the name of the symbol table record, the operation to perform on the record, and the data needed to perform the operation. The number of symbol tables is small enough to warrant individual treatment of each one.

The use of handles for diff files indicates that a diff file belongs to a unique base drawing file 300. To ensure that the correct base drawing 300 is undergoing the comparison by comparator 120, the diff file contains a identification that is compared to the base drawing 300. Prior to applying the diff file, the comparator compares the identification values of the base drawing 300 and the diff file, and warns the user if the values don't match.

Making Comparisons with the Comparator

The comparator 120 of the present invention uses one or more comparison methods to compare one object to another to determine equality. Depending on the comparison being made, the desires of the user, and other factors, the following comparison methods, or combinations of the following methods, are used by the comparator 120.

Class-By-Class

Within the comparator 120, software is written to treat each entity differently. The software is written to intelligently compare entities.

ActiveX™ Automation

Using ActiveX™ Automation type libraries (typlibs), the comparator 120 iterates over all of an object's readable properties and indicate which ones have changed. An Application Programming Interface (API) may also be used in conjunction with the ActiveX™ approach to install comparison modules. Comparison modules are associated with one or more classes of objects. When comparing two entities, the comparator 120 obtains the appropriate interfaces from the comparison module associated with the pertinent class.

Regress

The regress method uses a batch file called rdiff to compare two entities. The regress process first passes the files to be compared files through a filter, typically called dxfix, and transforms data from an input file based on rules contained in a rules (typically a DXT) file. Given the ASCII output from the two filtering runs, regress next compares the files using a utility file to show the differences (typically called adiff). This utility file takes the regress test number as a parameter, and uses a priori knowledge of the drawings it is comparing to show the differences between the two files.

Dxfcmp

The dxfcmp utility converts a DXF file such that each object occupies a single ASCII line of code. The output from that conversion is then input into a differences utility (called GNU diff).

Autodesk View 1.2

Using Autodesk View 1.2, two files are compared in a Windows environment. To compare two files, a user opens the files using a viewer window, and when they have been loaded, the user selects a command from the menu or toolbar to start the comparison. The results of that comparison are put into a third DWG file, which can then be saved if desired.

The resulting file is known as a "compare sheet" and contains five different outputs, called layers. The five inputs show the first drawing (drawing A) versions of entities that are different. This output is known as "Change-a." The second output, called "Change-b," contains the second drawing (drawing B) versions of entities that are different. The third output, called "In-a," contains the entities that are in drawing A, but not drawing B. The fourth output, called "In-b" contains entities that are in drawing B but not in drawing A. The fifth output, called "Same-as," contain the entities that are the same in both drawings. The names of the layers and their colors are user-configurable.

Each layer has a distinct color. By placing entities on different layers, View gives them different colors, which enables a user to determine what has changed between the drawings. The drawing changes can be blended into a single window or placed side by side for ease of viewing.

Binary Object Image

The binary object image method builds a table of entities for each file, each object having one entry. An object's key is then built by combining the text version of the object's class name and a hash value produced from the object's binary image. When the tables have been built, all entries with duplicate keys are removed. Objects remaining in the tables are then considered to be differences.

Visual Compare

The visual compare method generates a bitmap representation of the files to be compared. The two bitmaps are then compared pixel-by-pixel, and any differences are displayed in a special color.

Vector Compare

This is a variation on bitmap-based visual comparison. Instead of generating and comparing bitmaps, the comparator 120 compares vector primitives from each drawing's display list.

Flowchart

Figure 19:
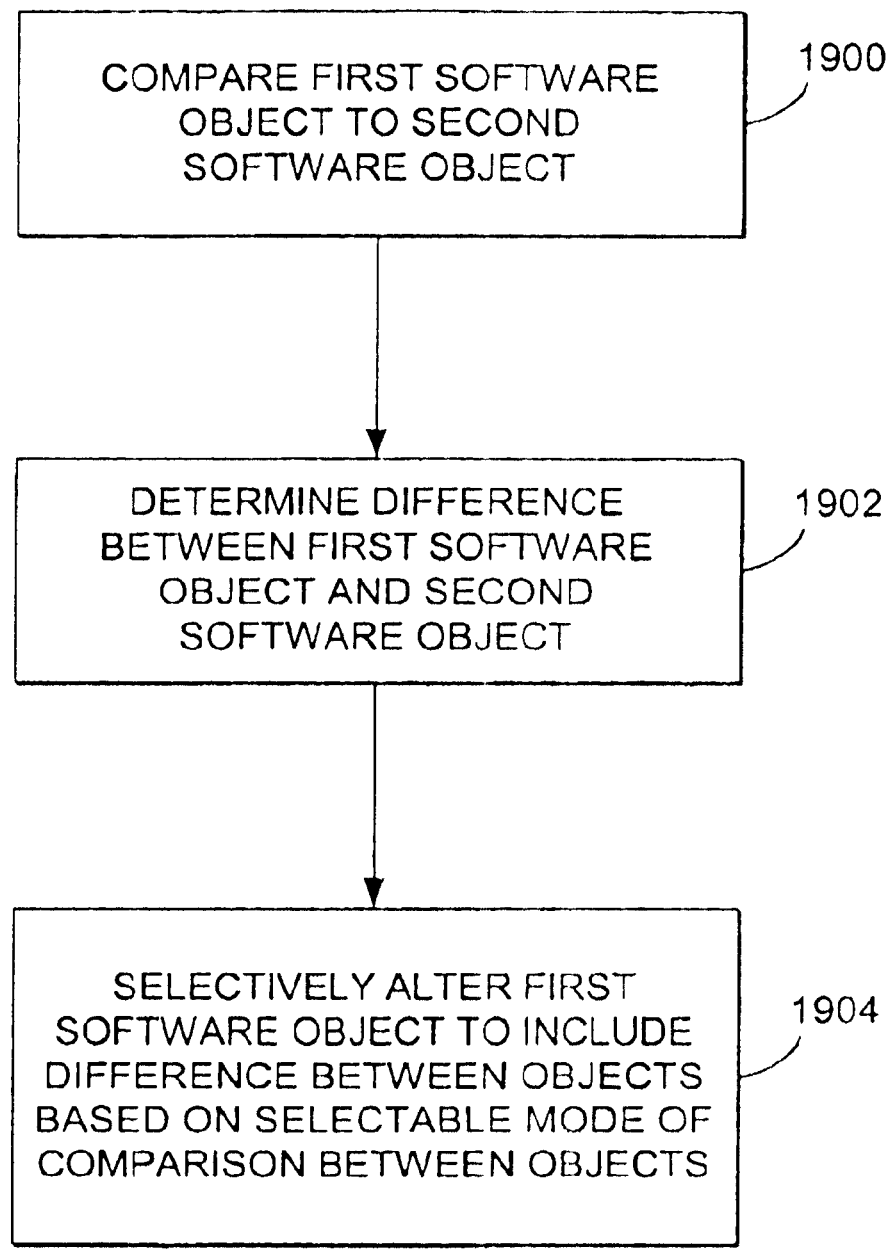
FIG. 19 is a flowchart that illustrates the general logic of performing the steps of the present invention.

FIG. 19 is a flowchart that illustrates the general logic of performing the steps of the present invention.

Block 1900 represents performing the step of comparing a first graphical software object with a second graphical software object.

Block 1902 represents the step of determining a difference between the first graphical software object and the second graphical software object;

Block 1904 represents performing the step of selectively altering the first graphical software object to include the difference between the first graphical software object and the second graphical software object into the first graphical software object, based on a selectable mode of comparison between the first graphical software object and the second graphical software object.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

In summary, the present invention discloses a method, apparatus, and article of manufacture for comparing a first graphical software object with a second graphical software object, determining a difference between the objects, and selectively altering the first graphical software object based on a selectable mode of comparison between the first graphical software object and the second graphical software object.

The present invention employs several modes of comparison, as well as several modes of resolving software object differences to expedite comparison times and provide users with flexibility and ease of use of the comparison tool of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of determining graphical software object equality within a graphics environment, comprising:
   comparing a first graphical software object with a second graphical software object to determine a difference between the first graphical software object and the second graphical software object; and
   displaying an altered display of the first graphical software object that comprises an indication of the difference between the first graphical software object and the second graphical software object.

2. The method of claim 1, wherein displaying the altered display of the first software object comprises:
   displaying the first graphical object with the difference between the first software object and the second software object highlighted; and
   querying a user whether the difference should be incorporated into the first software object.

3. The method of claim 1, wherein the comparing step is performed using a comparison method selected from the group comprising class-by-class, ActiveX™ automation, regress, dxfcmp, view, binary object image, visual compare, and vector compare.

4. The method of claim 1, further comprising:
   altering the first software object to incorporate the difference between the first graphical software object and the second graphical software object based on user input; and
   storing the altered first software object.

5. The method of claim 1 wherein the first graphical software object is compared to the second graphical software object based on a selectable mode of comparison.

6. The method of claim 5, wherein the selectable mode of comparison is selected from a group comprising revert, parallel evolution, and merge.

7. The method of claim 5, wherein the selectable mode of comparison is chosen by a time stamp on the first and second software objects.

8. The method of claim 1 wherein displaying the altered display of the first graphical software object comprises simultaneously displaying a first window and a second window wherein:
   the first window comprises the first graphical software object; and
   the second window comprises an altered display of the first graphical software object with an indication of the difference between the first graphical software object and the second graphical software object.

9. The method of claim 1 further comprising displaying a text message describing the difference between the first graphical software object and the second graphical software object.

10. The method of claim 1 wherein the comparing is based on parameters that are selectable by a user.

11. An apparatus for determining software object equality, comprising:
   a computer;
   a monitor coupled to the computer;
   a comparator, coupled to the computer, for accepting at least a first graphical software object and a second graphical software object for comparison and determination of a difference between the first graphical software object and the second graphical software object; and
   display means, coupled to the computer, for displaying an altered display of the first graphical software object that comprises an indication of the difference between the first graphical software object and the second graphical software object.

12. The apparatus of claim 11, wherein:
   the altered display of the first graphical software object comprises the difference between the first graphical software object and the second graphical software object; and
   the apparatus is further configured to query a user whether the difference should be incorporated into the first software object.

13. The apparatus of claim 11, wherein the comparator compares the first graphical software object and second graphical software object using a comparison method selected from the group comprising class-by-class, ActiveX™ automation, regress, dxfcmp, view, binary object image, visual compare, and vector compare.

14. The apparatus of claim 11, further comprising an input device, coupled to the computer, for allowing a user to selectively alter the first graphical software object to incorporate the difference between the first graphical software object and the second graphical software object.

15. The apparatus of claim 11, wherein the first graphical software object is compared to the second graphical software object based on a selectable mode of comparison.

16. The apparatus of claim 15, wherein the selectable mode of comparison is selected from a group comprising revert, parallel evolution, and merge.

17. The apparatus of claim 15, wherein the selectable mode of comparison is chosen by a time stamp on the first and second software objects.

18. The apparatus of claim 11, wherein the display means is configured to display the altered display of the first graphical software object by simultaneously displaying a first window and a second window wherein:

the first window comprises the first graphical software object; and the second window comprises an altered display of the first graphical software object with an indication of the difference between the first graphical software object and the second graphical software object.

19. The apparatus of claim 11 wherein the display means is further configured to display a text message describing the difference between the first graphical software object and the second graphical software object.

20. The apparatus of claim 11 wherein the comparing is based on parameters that are selectable by a user.

21. An article of manufacture comprising a computer program carrier readable by a computer and embodying one or more instructions executable by the computer to perform a method of determining software object equality within a graphics environment, the method comprising:

comparing a first graphical software object with a second graphical software object to determine a difference between the first graphical software object and second graphical software object; and displaying an altered display of the first graphical software object that comprises an indication of the difference between the first graphical software object and the second graphical software object.

22. The apparatus of claim 21, wherein:

the altered display of the first graphical software object comprises the difference between the first graphical software object and the second graphical software object; and the apparatus is further configured to query a user whether the difference should be incorporated into the first software object.

23. The article of manufacture of claim 21, wherein the first graphical software object is compared to the second graphical software object using a comparison method selected from the group comprising class-by-class, ActiveX™ automation, regress, dxfcmp, view, binary object image, visual compare, and vector compare.

24. The article of manufacture of claim 21, further comprising accepting input from a user to selectively alter the first graphical software object to incorporate the difference between the first graphical software object and the second graphical software object.

25. The article of manufacture of claim 21 wherein the first graphical software object is compared to the second graphical software object based on a selectable mode of comparison.

26. The article of manufacture of claim 25, wherein the selectable mode of comparison is selected from a group comprising revert, parallel evolution, and merge.

27. The article of manufacture of claim 25, wherein the selectable mode of comparison is chosen by a time stamp on the first and second software objects.

28. The article of manufacture of claim 21 displaying the altered display of the first graphical software object comprises simultaneously displaying a first window and a second window wherein:

the first window comprises the first graphical software object; and the second window comprises an altered display of the first graphical software object with an indication of the difference between the first graphical software object and the second graphical software object.

29. The article of manufacture of claim 21, wherein the method further comprises displaying a text message describing the difference between the first graphical software object and the second graphical software object.

30. The article of manufacture of claim 21 wherein the comparing is based on parameters that are selectable by a user.

* * * * *